(12) United States Patent
Sheng et al.

(10) Patent No.: US 8,248,036 B2
(45) Date of Patent: Aug. 21, 2012

(54) BATTERY CHARGING CIRCUIT FOR IMPROVING OPERATING STABILITY

(75) Inventors: Kang Sheng, Taoyuan County (TW); Zong-Yu Wu, Changhua County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 315 days.

(21) Appl. No.: 12/828,204

(22) Filed: Jun. 30, 2010

(65) Prior Publication Data
US 2011/0193531 A1  Aug. 11, 2011

(30) Foreign Application Priority Data

Feb. 11, 2010 (TW) ................. 99104366 A

(51) Int. Cl.
*H02J 7/04* (2006.01)
*H02J 7/00* (2006.01)
(52) U.S. Cl. .................. 320/148; 320/128; 320/162
(58) Field of Classification Search .............. 320/148, 320/128, 162
See application file for complete search history.

(56) References Cited

U.S. PATENT DOCUMENTS

| | | | | |
|---|---|---|---|---|
| 5,371,666 A | * | 12/1994 | Miller | 363/98 |
| 5,869,948 A | * | 2/1999 | Becker-Irvin | 320/101 |
| 8,044,649 B2 | * | 10/2011 | Schmeller et al. | 323/285 |

* cited by examiner

*Primary Examiner* — M'Baye Diao
(74) *Attorney, Agent, or Firm* — Winston Hsu; Scott Margo

(57) ABSTRACT

A battery charging circuit for charging a rechargeable battery and improving operating stability includes a plurality of resistors for generating a first voltage; a first reference voltage source for providing a first reference voltage; an error amplifier for generating a second voltage according to the voltage difference between the first reference voltage and the first voltage; a second reference voltage source for providing a second reference voltage; a modulator for generating a control voltage according to the second reference voltage and the second voltage; a voltage-to-current control unit for generating a control current according to the control voltage; and a current mirror for generating an output current which is equal to a multiple of the control current, wherein the output current and its corresponding output voltage is applied to charge the rechargeable battery.

10 Claims, 6 Drawing Sheets

BATTERY CHARGING CIRCUIT FOR IMPROVING OPERATING STABILITY

BACKGROUND OF THE INVENTION

1. Field of the Invention

The present invention relates to a battery charging circuit for charging a rechargeable battery, and more particularly, to a battery charging circuit capable of enhancing operating stability.

2. Description of the Prior Art

Rechargeable batteries are widely used in a variety of handheld or mobile electronic devices, such as a mobile phone, a personal digital assistant (PDA), a laptop, etc. Since a rechargeable battery needs to be charged with a corresponding battery charger, quality of a battery charger affects safety, cost and efficiency of charging a rechargeable battery.

In general, lithium batteries are the most widely used rechargeable batteries by consumers. In a normal condition, a voltage across a lithium battery varies within a specific range. In other words, the voltage across the lithium battery is around 4.2V when the lithium battery is fully charged. After normal operations, electric energy stored in the lithium battery is gradually consumed, and the voltage across the lithium battery drops to around 3.0V. As a result, the lithium battery needs to be charged by a battery charger, such that the lithium battery can be refilled with electric energy and provides electric power to electronic devices. Therefore, a basic function of the battery charger provides electric power to a rechargeable battery during charging process, such that the voltage of the rechargeable battery can gradually increase from around 3.0V to around 4.2V, i.e. the rechargeable battery is fully charged. Noticeably, if the voltage across the lithium battery is less than 3.0V, it means the lithium battery may be damaged inside. As a result, the battery charger needs to charge the lithium battery with a trickle current first (known as a trickle mode), and then starts to charge the lithium battery with a greater current until the voltage across the lithium battery is above 3.0V.

In a normal charging operation, i.e. the voltage across the battery is between 3.0V to 4.2V, in order to enhance efficiency and safety of the charging operation, the battery charger charges the rechargeable battery with a greater current first when the electricity of the rechargeable battery is depleted or the voltage across the battery is low (around 3.0V), so as to shorten charging time. The above charging method is known as a constant current (CC) mode. When the voltage across the rechargeable battery approaches a full voltage level (slightly less than 4.2V), the battery charger changes the charging mode to a constant voltage (CV) mode, to charge the rechargeable battery with a constant voltage (4.2V), so as to enhance safety. Therefore, during the charging process, the battery charger can choose CC mode or CV mode according to the voltage across the rechargeable battery, efficiently and safely charge the battery.

Please refer to FIG. 1A, which is a schematic diagram of a conventional constant current battery charging circuit 10. The constant current battery charging circuit 10 includes an error amplifier 100, a low-power transistor 102, a high-power transistor 104 and an external resistor R_ext1 outside a chip. The constant current battery charging circuit 10 can be connected with a rechargeable battery RCBAT1, and charges the rechargeable battery RCBAT1 in the constant current mode. A user can adjust resistance of the external resistor R_ext1 to control a current flowing through the low-power transistor 102. Then, since gate voltages of the low-power transistor 102 and the high-power transistor 104 are the same, and both the low-power transistor 102 and the high-power transistor 104 are P-type metal oxide semiconductor field effect transistors (PMOSFETs), a difference between the low-power transistor 102 and the high-power transistor 104 is that a width to length ratio of the high-power transistor 104 is a multiple of that of the low-power transistor 102. Therefore, the current flowing through the high-power transistor 104 is the multiple of the current flowing through the low-power transistor 102. In other words, the high-power transistor 104 can be conducted with the current equal to the multiple of that of the low-power transistor 102. Therefore, the current flowing through the low-power transistor 102 mirrors many times current in the high-power transistor 104, so as to effectively charge the rechargeable battery RCBAT1.

Furthermore, please refer to FIG. 1B, which is one of conventional constant voltage battery charging circuits 15. The constant voltage battery charging circuit 15 includes an error amplifier 150, a high-power transistor 152, and resistors R1 and R2 for dividing voltage. The constant voltage battery charging circuit 15 fixes an output voltage at a specific voltage, and charges the rechargeable battery RCBAT1 in the constant voltage mode.

As can be seen from the above, the battery charger can choose the constant current mode or the constant voltage mode to charge the rechargeable battery. For simplifying circuits, the high-power transistors 104 and 152 can be realized by the same high-power transistor, and the constant current battery charging circuit 10 and the constant voltage battery charging circuit 15 can be combined into one circuit after a mode determination mechanism is added. Conventionally, the battery charger compares output voltages of the error amplifiers 100 and 150, and then the higher output voltage ties to the gate of high-power transistor, to control conduction of the high-power transistor. As a result, the battery charger can choose a proper mode between the constant current mode and the constant voltage mode to charge the rechargeable battery.

However, since there is a parasitic capacitor C_para1 outside the chip connected with the external resistor R_ext1 in parallel. According to experimental results, once the resistance of the resistor R_ext1 is getting greater, the system oscillates and doesn't apply the constant current, such that the battery charger cannot operate normally.

SUMMARY OF THE INVENTION

Therefore, the present invention provides new circuits for improving the system stability.

The present invention discloses a battery charging circuit capable of enhancing operating stability, for charging a rechargeable battery. The battery charging circuit includes a plurality of voltage dividing resistors, for dividing a voltage according to a voltage across the rechargeable battery, to generate a first voltage, a first reference voltage source, for providing a first reference voltage, an error amplifier, for generating a second voltage according to a voltage difference between the first reference voltage and the first voltage, a second reference voltage source, for providing a second reference voltage, a modulator, for generating a control voltage according to the second reference voltage and the second voltage, a voltage-to-current control unit, for generating a control current according to the control voltage; and a current mirror, for generating an output current equal to a multiple of the control current according to the control current. The output current and a corresponding output voltage are utilized for charging the rechargeable battery.

These and other objectives of the present invention will no doubt become obvious to those of ordinary skill in the art after reading the following detailed description of the preferred embodiment that is illustrated in the various figures and drawings.

DETAILED DESCRIPTION

Figure 2A:
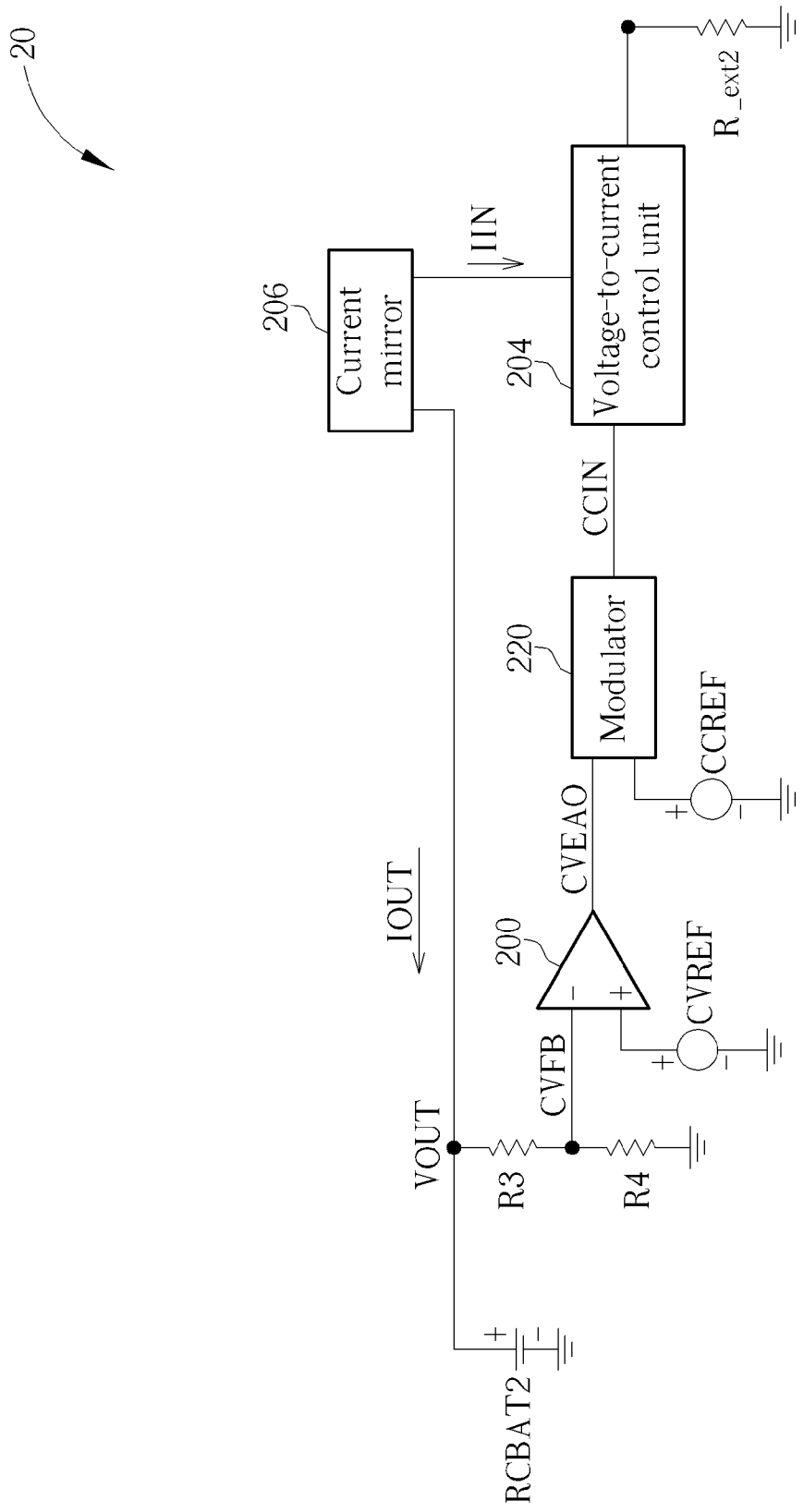
FIG. 2A is a schematic diagram of a battery charging circuit according to an embodiment of the present invention.

Please refer to FIG. 2A, which is a schematic diagram of a battery charging circuit 20 according to an embodiment of the present invention. The battery charging circuit 20 includes voltage dividing resistors R3 and R4, an error amplifier 200, reference voltage sources for generating reference voltages CCREF and CVREF, a modulator 220, a voltage-to-current control unit 204 and a current mirror 206. The battery charging circuit 20 is utilized for charging a rechargeable battery RCBAT2. The voltage dividing resistors R3 and R4 are utilized for dividing a voltage according to a voltage VOUT across the rechargeable battery RCBAT2, to generate a voltage CVFB. The error amplifier 200 generates another voltage CVEAO according to a voltage difference between the reference voltage CVREF and the voltage CVFB. Then, the modulator 220 generates a control voltage CCIN according to the reference voltage CCREF and the voltage CVEAO. The voltage-to-current control unit 204 generates a control current IIN according to the control voltage CCIN. The current mirror 206 generate an output current IOUT equal to a multiple of the control current IIN according to the control current IIN. The output current IOUT or the output voltage VOUT can be utilized for charging the rechargeable battery RCBAT2. Besides, the voltage-to-current control unit 204 can be connected with an external resistor R_ext2. In FIG. 2A, the battery charging circuit 20 can operate in constant current (CC) mode, constant voltage (CV) mode, etc. First, in the constant current mode, the reference voltage CVREF is greater than the voltage CVFB, which means the voltage VOUT across the rechargeable battery RCBAT2 is still small, and the output voltage CVEAO of the error amplifier 200 is a greater positive voltage. Meanwhile, the modulator 220 compares the reference voltage CCREF with the voltage CVEAO, to generate the control voltage CCIN. If the voltage CVEAO is greater than the reference voltage CCREF, the modulator 220 outputs the control voltage CCIN equal to a voltage level of the reference voltage CCREF. As a result, the battery charging circuit 20 can drive the voltage-to-current control unit 204 with the constant control voltage CCIN (i.e. the voltage level of the reference voltage CCREF), to generate the constant control current IIN. The battery charging circuit 20 can also amplify the control current IIN the multiple of times into the output current IOUT via the current mirror 206, to charge the rechargeable battery RCBAT2.

On the other hand, in the constant voltage mode, the voltage across the rechargeable battery RCBAT2 approaches a voltage level when the rechargeable battery RCBAT2 is fully charged, and the reference voltage CVEAO becomes smaller than the reference voltage CCREF gradually. Meanwhile, if the control voltage CCIN of the modulator 220 is set equal to a voltage level of the reference voltage CVEAO, and the voltage-to-current control unit 204 is driven with this voltage level, a current level of the control current IIN would drop to be near or equal to 0 A, and current level of the output current IOUT would drop to be near or equal to 0 A as well. As a result, the output voltage VOUT can maintain a constant, and the constant output voltage VOUT can be utilized for charging the rechargeable battery RCBAT2.

Figure 2B:
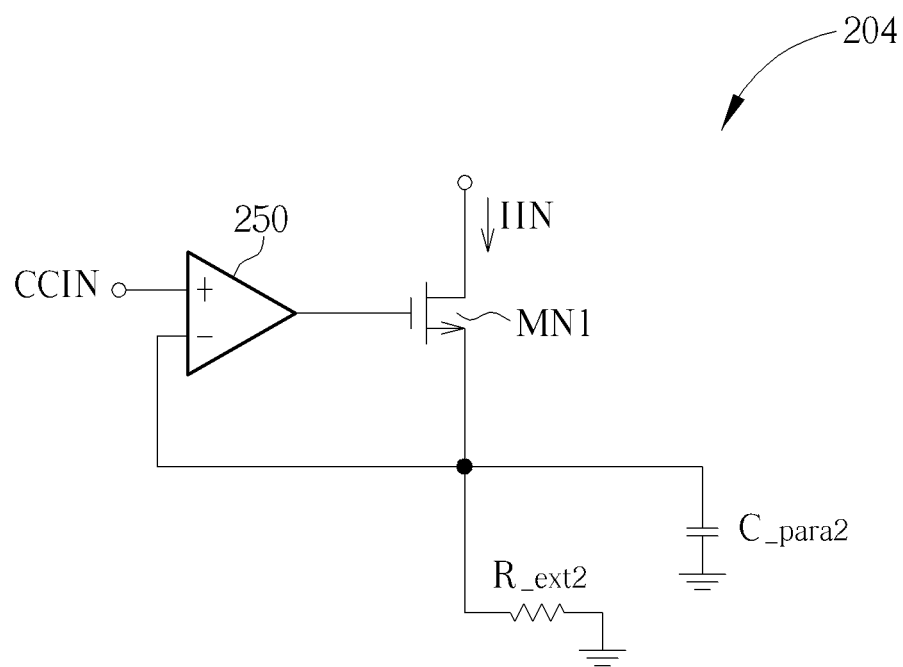
FIG. 2B is a schematic diagram of the voltage-to-current control unit in FIG. 2A.
Figure 2C:
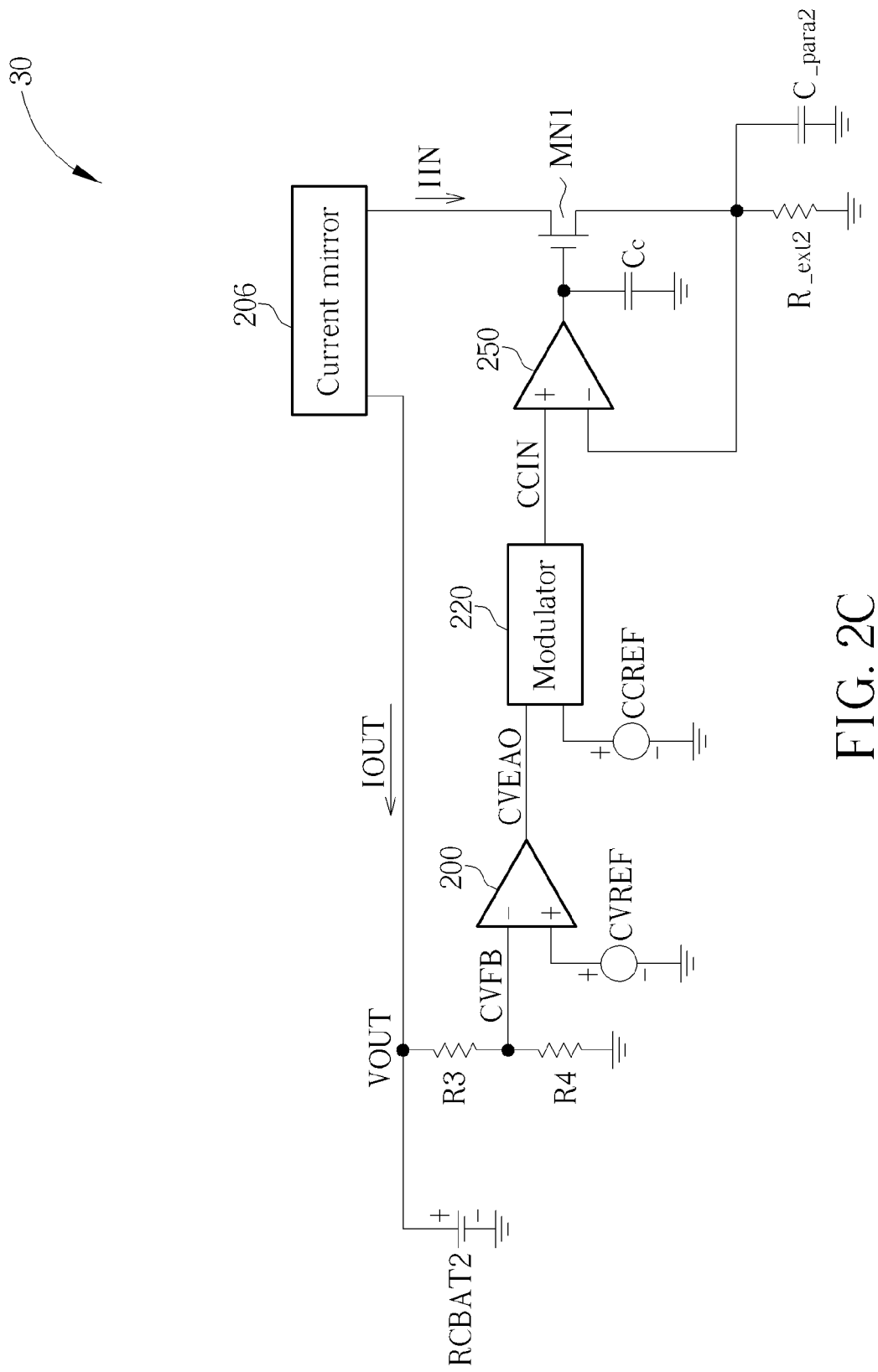
FIG. 2C is a schematic diagram of a battery charging circuit according to another embodiment of the present invention.
Figure 2D:
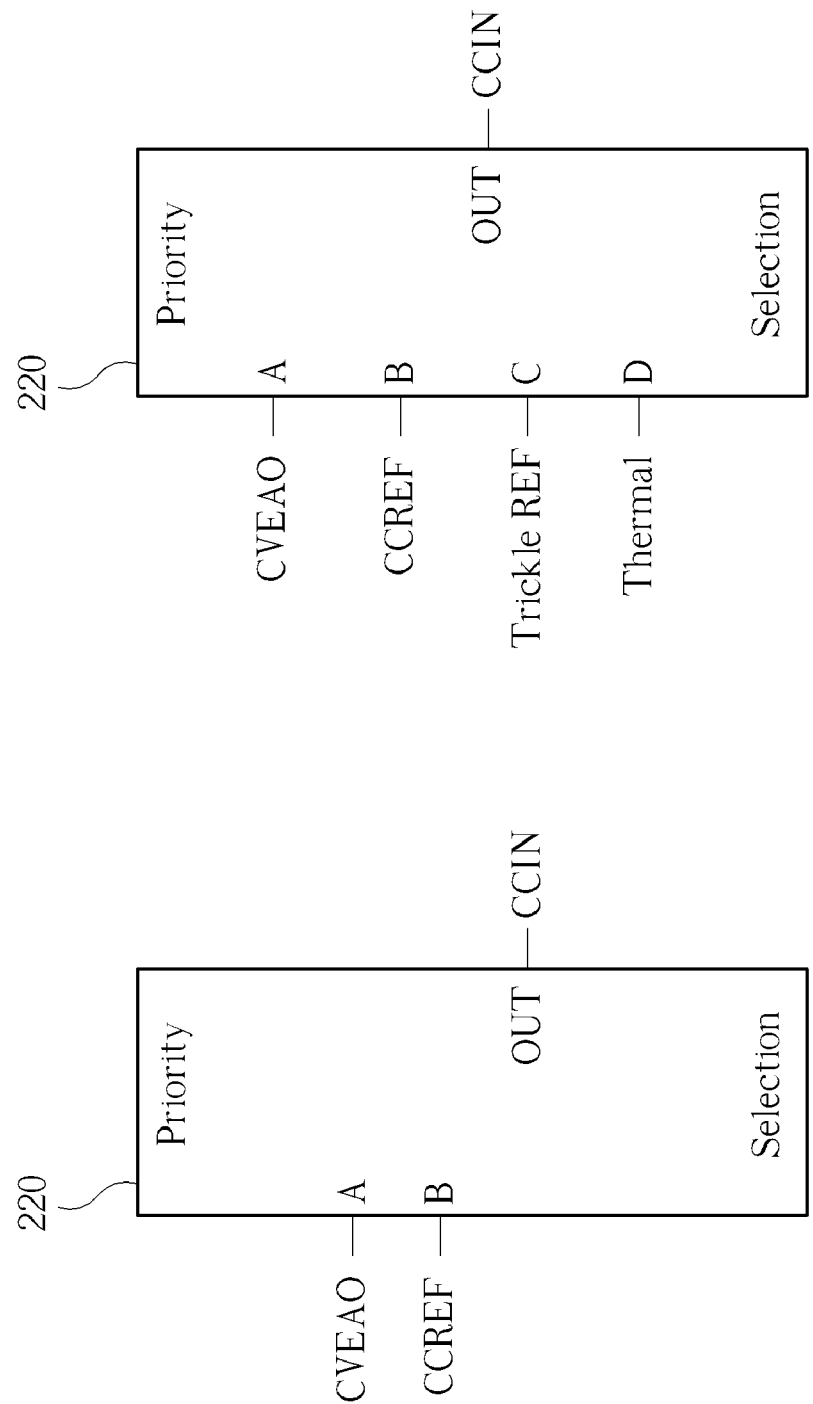
FIG. 2D is a schematic diagram of the modulator in FIG. 2A.

For detailed structure and operations of the battery charging circuit 20, please refer to FIG. 2B to FIG. 2D. FIG. 2B is a schematic diagram of the voltage-to-current control unit 204 shown in FIG. 2A. The voltage-to-current control unit 204 includes an operational amplifier (OP) 250 and an NMOSFET MN1. The OP 250 takes the control voltage CCIN and a source voltage of the N-type metal oxide semiconductor field effect transistor (NMOSFET) MN1 as input voltages, and an output terminal of the OP 250 is connected with a gate of the NMOSFET MN1, such that the source voltage of the NMOSFET MN1 substantially equals the control voltage CCIN. Meanwhile, a source of the NMOSFET MN1 is connected with an external resistor R_ext2, and resistance of the resistor R_ext2 can be utilized for determining the control current IIN. In detail, the control current IIN equals the control voltage CCIN divided by the resistance of the resistor R_ext2. In the present invention, the user can choose the resistance of the resistor R_ext2, to determine the control current IIN.

In the battery charging circuit 20, the voltage-to-current control unit 204 can form a control loop, where the included NMOSFET MN1 belongs to a source follower. Since the source of the NMOSFET MN1 is a low impedance node, even if the resistance of the external resistor R_ext2 is great, corresponding resistance of the node is still small, and the node would not generate a low frequency pole with a parasitic capacitor C_para2. As for an output node of the OP 250, since corresponding capacitance and resistance are greater, the output node becomes a dominant pole of the control loop. Furthermore, in order to further enhance stability of the control loop, the present invention can preferably add a compensating capacitor in the output node of the OP 250, as a battery charging circuit 30 shown in FIG. 2C, to increase the corresponding capacitance of the output node of the OP 250, and properly reduce a corresponding pole frequency of the node. As a result, the stability of the control loop can be further enhanced. In short, since all non-dominant poles are at high frequencies, and much higher than a unit gain frequency of the control loop, there is only one dominant pole of the control loop at low frequency, such that the voltage-to-current control unit 204 can be very stable. As a result, even if the user needs to use the external resistor R_ext2 with high resistance according to practical requirements, or the capacitance of the parasitic capacitor C_para2 between the chip and circuit board is great, the voltage-to-current control unit 204 would not become unstable.

Figure 1A:
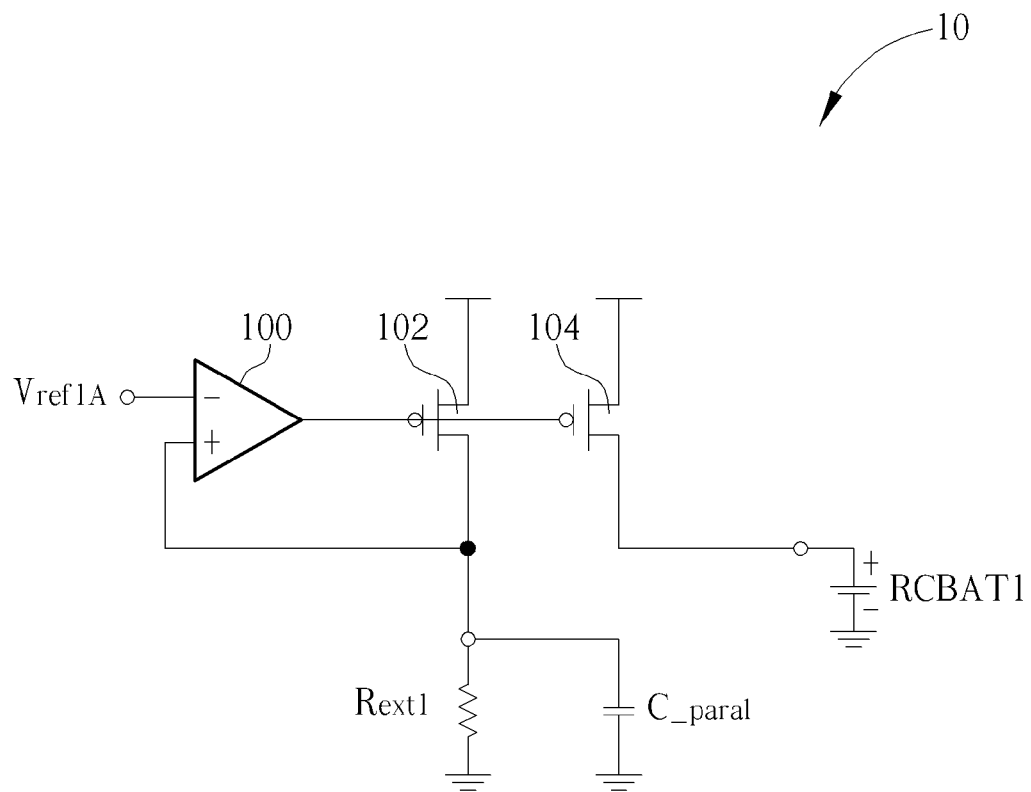
FIG. 1A is a schematic diagram of a conventional constant current battery charging circuit.
Figure 1B:
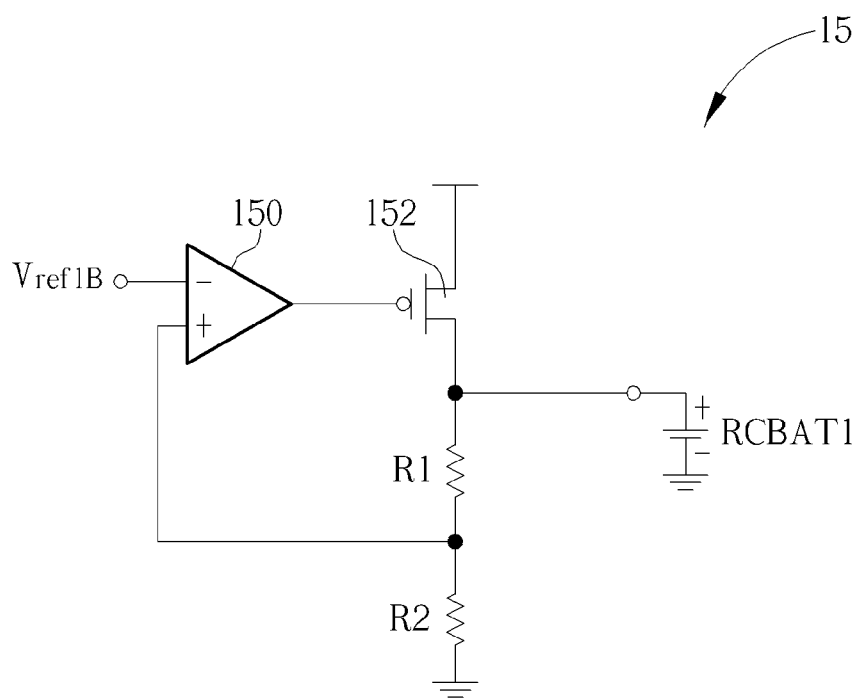
FIG. 1B is one of conventional constant voltage battery charging circuits 15.

On the contrary, in the prior art, when the resistance of the external resistor R_ext1 of the constant current battery charging circuit 10 in FIG. 1A is great, unstable oscillation occurs, which can be analyzed from two aspects. First, in the constant current battery charging circuit 10, the low-power transistor 102 and the high-power transistor 104 share the same gate voltage, and there is a parasitic capacitor Cgs104 with high capacitance between the gate and the source of the high-power transistor 104, such that the parasitic capacitor Cgs104 affects operation and stability of the control loop. Besides, resistance of the same node is substantially equal to an output resistor Rout100 of the error amplifier 100. As a result, the corresponding parasitic capacitor Cgs104 and the output resistor Rout100 of the node determine the dominant pole of the control loop. Second, in the constant current battery charging circuit 10, since the drain of the low-power transistor 102 is connected with the external resistor R_ext1 and a drain of a metal oxide semiconductor field effect transistor (MOSFET) is a high impedance node, the parasitic capacitor C_para1 generates another low frequency pole in the control loop. According to the related control theory, two low frequency poles can reduce a phase margin of the control loop to zero, such that the system may have unstable oscillation if the gain is greater than 1.

In addition, in the prior art, since there is a parasitic capacitor C_para1 connected with the external resistor R_ext1 in parallel outside the chip, when the resistance of the resistor R_ext1 is great, voltages of related nodes and the output current include unstable oscillations, such that the battery charger cannot operate normally. In comparison, the current mirror 206 generates the output current IOUT which is the multiple of the control current IIN according to the control current IIN, which is similar to operations of the low-power transistors 102 and 104, for generating the multiple of current. However, the parasitic capacitor of the present invention does not affect operations of the control loop of the voltage-to-current control unit 204, such that the present invention has higher stability.

Noticeably, the modulator 220 can have more than two input terminals as well. For example, please refer to FIG. 2D, which is a schematic diagram of the modulator 220 shown in FIG. 2A. As shown in FIG. 2D, other than original input terminals A, B for the reference voltage CCREF and the voltage CVEAO, respectively, an input terminal C can be further added in the modulator 220 of the battery charging circuit 20, for charging the battery in the trickle mode when the voltage across the rechargeable battery is less than 3.0V, and charging the battery in the constant current mode when the voltage across the rechargeable battery returns to above 3.0V. Otherwise, an input terminal D can be further added in the modulator 220 for thermal protection.

As can be seen from the above, the present invention utilizes the control loop based on voltage signals, and adds the circuits such as the voltage-to-current control unit and the current mirror for adjusting current. Besides, the present invention utilizes a modulator to modulate signals within the control loop, such that the circuit can operate in the constant current mode, the constant voltage mode or other modes.

To sum up, according to the battery charger structure of the present invention, the user can choose the resistance of the external resistor, to control the charging current and still maintain stability of the battery charger, so as to significantly enhance safety and efficiency of the charging process.

Those skilled in the art will readily observe that numerous modifications and alterations of the device and method may be made while retaining the teachings of the invention.

What is claimed is:

1. A battery charging circuit capable of enhancing operating stability, for charging a rechargeable battery, comprising:
   a plurality of voltage dividing resistors, for dividing a voltage according to a voltage across the rechargeable battery, to generate a first voltage;
   a first reference voltage source, for providing a first reference voltage;
   an error amplifier, for generating a second voltage according to a voltage difference between the first reference voltage and the first voltage;
   a second reference voltage source, for providing a second reference voltage;
   a modulator, for generating a control voltage according to the second reference voltage and the second voltage;
   a voltage-to-current control unit, for generating a control current according to the control voltage; and
   a current mirror, for generating an output current equal to a multiple of the control current according to the control current;
   wherein the output current and a corresponding output voltage are utilized for charging the rechargeable battery.

2. The battery charging circuit of claim 1, wherein the error amplifier comprises a positive input terminal, for receiving the first reference voltage, a negative input terminal, for receiving the first voltage, and an output terminal.

3. The battery charging circuit of claim 1, wherein the modulator is utilized for outputting the second voltage as the control voltage when the second reference voltage is greater than the second voltage, and outputting the second reference voltage as the control voltage when the second reference voltage is smaller than or equal to the second voltage.

4. The battery charging circuit of claim 1, wherein the voltage-to-current control unit comprises:
   an operational amplifier (OP), comprising a first input terminal, for receiving the control voltage, a second input terminal and an output terminal; and
   an N-type metal oxide semiconductor field effect transistor (NMOSFET), comprising a gate, coupled to the output terminal of the OP, a source, coupled to the second input terminal of the OP, and a drain, for outputting the control current as a current output terminal.

5. The battery charging circuit of claim 4, wherein the voltage-to-current control unit further comprises a compensating capacitor, coupled to the output terminal of the OP, for adjusting a frequency of a dominant pole of a control loop of the voltage-to-current control unit.

6. The battery charging circuit of claim 4, wherein the first input terminal of the OP of the voltage-to-current control unit is a positive terminal, and the second input terminal is a negative terminal.

7. The battery charging circuit of claim 4, wherein the source of the NMOSFET is coupled to an external resistor, for setting a charging current.

8. The battery charging circuit of claim 1, wherein the current mirror comprises a first metal oxide semiconductor field effect transistor (MOSFET) and a second MOSFET, and a width to length ratio of the first MOSFET is the multiple of a width to length ratio of the second MOSFET.

9. The battery charging circuit of claim 1, wherein the first reference voltage is corresponding to the voltage across the rechargeable battery when the rechargeable battery is fully charged.

10. The battery charging circuit of claim 1, wherein the second reference voltage is corresponding to the charging current when the battery charging circuit operates in a constant current mode.

* * * * *